US008926148B2

(12) United States Patent
Shumate et al.

(10) Patent No.: US 8,926,148 B2

(45) Date of Patent: Jan. 6, 2015

(54) BEACON LIGHT HAVING A LENS

(71) Applicant: SPX Corporation, Charlotte, NC (US)

(72) Inventors: Christopher Shumate, Franklin, TN (US); David Duryea, Franklin, TN (US); Nimrod McDade, III, Franklin, TN (US); Russell Bruner, Franklin, TN (US); Handani Kam, Franklin, TN (US); Christopher Range, Franklin, TN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 13/939,687

(22) Filed: Jul. 11, 2013

(65) Prior Publication Data

US 2014/0016320 A1 Jan. 16, 2014

Related U.S. Application Data

(60) Provisional application No. 61/691,968, filed on Aug. 22, 2012, provisional application No. 61/670,786, filed on Jul. 12, 2012.

(51) Int. Cl.

| | |
|---|---|
| ***B60Q 1/00*** | (2006.01) |
| ***F21V 5/00*** | (2006.01) |
| ***F21V 29/00*** | (2006.01) |
| ***F21V 21/14*** | (2006.01) |

(52) U.S. Cl.

CPC ................. *F21V 5/008* (2013.01); *F21V 29/22* (2013.01); *F21V 21/14* (2013.01)

USPC ...... 362/477; 362/249.02; 362/235; 362/363; 362/311.12

(58) Field of Classification Search

USPC .................... 362/235, 245, 246, 247, 249.01, 362/249.02, 249.1, 268, 269, 307–309, 362/311.12, 326, 331, 335, 336, 337, 362, 362/363, 477, 540, 545, 555, 800; 340/468, 340/472, 815.76, 815.77, 984

See application file for complete search history.

(56) References Cited

U.S. PATENT DOCUMENTS

| | | | | |
|---|---|---|---|---|
| 1,133,536 | A * | 3/1915 | Chase | 362/477 |
| 1,292,123 | A | 1/1919 | Steiger | |
| 1,759,609 | A * | 5/1930 | Eskilson | 362/337 |
| 2,489,076 | A | 11/1949 | Bjontegard | |
| 2,586,374 | A * | 2/1952 | Pennow | 362/247 |
| 2,709,224 | A | 5/1955 | Garnick | |
| 2,850,716 | A * | 9/1958 | Smale | 362/269 |
| 3,031,582 | A | 4/1962 | Benner et al. | |
| 3,093,785 | A | 6/1963 | Edgerton | |
| 3,094,286 | A | 6/1963 | Harling | |
| 3,221,162 | A | 11/1965 | Heenan et al. | |
| 3,253,139 | A | 5/1966 | Anderson | |
| 3,349,239 | A | 10/1967 | Fahey, Jr. et al. | |

(Continued)

OTHER PUBLICATIONS

International Search Report issued in PCT/US2013/050068 dated Dec. 20, 2013.

(Continued)

*Primary Examiner* — Hargobind S Sawhney

(74) *Attorney, Agent, or Firm* — Baker & Hostetler LLP

(57) ABSTRACT

A lens system includes multiple light emitting diode sources. The lens system further includes optics configured to capture and direct light from the multiple light emitting diode sources. The system generates a 360° horizontal beam pattern and a predetermined vertical beam pattern.

18 Claims, 11 Drawing Sheets

(56) References Cited

U.S. PATENT DOCUMENTS 3,488,630 A * 1/1970 Decker et al. ................. 340/472
3,543,099 A 11/1970 Turner
3,818,218 A * 6/1974 Heenan et al. ................ 362/297
3,852,584 A 12/1974 Levin
3,875,561 A 4/1975 Scarpino et al.
3,949,211 A 4/1976 Elms
3,961,180 A 6/1976 Schultz
4,023,035 A 5/1977 Rodriguez
4,527,158 A 7/1985 Runnels
4,542,448 A 9/1985 Yamai et al.
4,672,206 A 6/1987 Suzuki et al.
4,758,767 A 7/1988 Blake
4,767,172 A 8/1988 Nichols et al.
4,791,290 A 12/1988 Noone et al.
4,839,782 A * 6/1989 Sikora ........................... 362/363
4,907,139 A 3/1990 Quiogue
5,450,302 A 9/1995 Maase et al.
5,556,189 A 9/1996 Wallis
5,806,965 A 9/1998 Deese
5,899,557 A 5/1999 McDermott
5,929,788 A 7/1999 Vukosic
6,086,220 A 7/2000 Lash et al.
6,183,100 B1 2/2001 Suckow et al.
6,322,234 B1 11/2001 Drake et al.
6,425,678 B1 7/2002 Verdes et al.
6,483,254 B2 11/2002 Vo et al.
6,525,668 B1 2/2003 Petrick
6,543,911 B1 4/2003 Rizkin et al.
6,554,441 B2 4/2003 Rohlfing et al.
6,572,249 B2 6/2003 Bailey
6,598,998 B2 7/2003 West et al.
6,667,582 B1 12/2003 Procter
6,695,462 B2 2/2004 Rohlfing et al.
6,899,443 B2 5/2005 Rizkin et al.
6,905,228 B1 6/2005 Takeyasu et al.
6,932,496 B2 8/2005 Rizkin et al.
6,948,830 B1 9/2005 Petrick
6,951,418 B2 10/2005 Rizkin et al.
6,988,815 B1 1/2006 Rizkin et al.
6,989,768 B2 1/2006 DeMarco et al.
6,991,351 B1 1/2006 Pertick
7,014,337 B2 3/2006 Chen
7,016,802 B2 3/2006 Flaherty
7,040,786 B2 5/2006 Ganzer et al.
7,079,041 B2 7/2006 Fredericks et al.
7,111,961 B2 9/2006 Trenchard et al.
7,192,155 B2 3/2007 Morrow et al.
7,208,881 B2 4/2007 Young
7,217,006 B2 5/2007 Trenchard et al.
7,252,405 B2 8/2007 Trenchard et al.
7,357,530 B2 4/2008 Wang et al.
7,378,983 B2 5/2008 Wang et al.
7,407,303 B2 8/2008 Wanninger et al.
7,497,593 B2 3/2009 Wang
7,503,669 B2 3/2009 Rizkin et al.
7,547,876 B2 6/2009 Flaherty
7,568,821 B2 8/2009 Peck et al.
7,569,802 B1 8/2009 Mullins
7,572,030 B2 8/2009 Booth et al.
7,581,854 B2 9/2009 Ford
7,604,380 B2 10/2009 Burton et al.
7,619,234 B2 11/2009 Thorsted
7,641,361 B2 1/2010 Wedell et al.
7,645,053 B2 1/2010 Machi et al.
7,686,481 B1 3/2010 Condon et al.
7,712,922 B2 5/2010 Hacker et al.
7,712,931 B1 5/2010 Smith
7,722,215 B2 5/2010 Ward et al.
7,726,846 B2 6/2010 Yang et al.
7,731,384 B2 6/2010 Curran et al.
7,758,210 B2 7/2010 Peck
7,794,124 B2 9/2010 Hulsey et al.
7,804,251 B2 9/2010 Wang
7,810,968 B1 10/2010 Walker et al.
7,832,908 B2 11/2010 Peck et al.
7,841,743 B2 11/2010 Wang et al.
7,880,637 B2 2/2011 Weiss
7,995,882 B2 8/2011 Wanninger et al.
8,033,683 B2 10/2011 Fields
8,066,400 B2 11/2011 Curran et al.
8,083,382 B1 12/2011 Sebek
8,096,677 B2 1/2012 Fields et al.
8,138,941 B2 3/2012 Smith et al.
8,143,568 B2 3/2012 Flaherty
8,177,597 B2 * 5/2012 Kolb ............................... 445/22
8,220,959 B2 7/2012 Rizkin et al.
2002/0122309 A1 9/2002 Abdelhafez et al.
2002/0145533 A1 10/2002 Bushell et al.
2004/0218391 A1 11/2004 Procter
2005/0146875 A1 7/2005 Klein
2006/0083017 A1 4/2006 Wang et al.
2006/0120083 A1 * 6/2006 Trojanowski et al. ........ 362/294
2006/0132323 A1 6/2006 Grady, Jr.
2006/0176702 A1 8/2006 Shen et al.
2006/0266838 A1 11/2006 Vinogradov et al.
2006/0268549 A1 11/2006 Oehlke
2007/0164875 A1 7/2007 Fredericks et al.
2008/0192480 A1 8/2008 Rizkin et al.
2009/0073697 A1 3/2009 Peck et al.
2009/0219715 A1 9/2009 Peck et al.
2010/0027281 A1 2/2010 Waters et al.
2010/0091507 A1 4/2010 Li et al.
2010/0123397 A1 5/2010 Tian et al.
2010/0259929 A1 10/2010 Henri et al.
2010/0294961 A1 11/2010 Ashdown
2011/0006920 A1 1/2011 Bauer
2011/0018439 A1 1/2011 Fabbri et al.
2011/0058370 A1 3/2011 Datz et al.
2011/0121734 A1 5/2011 Pape
2011/0235322 A1 9/2011 Fileds et al.
2011/0305014 A1 12/2011 Peck
2012/0039071 A1 2/2012 Curran et al.
2012/0182730 A1 7/2012 Datz et al.

OTHER PUBLICATIONS

Notification of Transmittal of The International Search Report and the Written Opinion of the International Searching Authority, or the Declaration.

* cited by examiner

BEACON LIGHT HAVING A LENS

CROSS REFERENCE TO PRIOR APPLICATIONS

This application claims the benefit from U.S. Provisional Application No. 61/670,786 filed on Jul. 12, 2012 and U.S. Provisional Application No. 61/691,968 filed on Aug. 22, 2012 which are both hereby incorporated by reference in their entirety.

BACKGROUND OF THE DISCLOSURE

1. Field of the Disclosure

This disclosure is directed to a device for directing light from light emitting diode sources, and, more particularly to a device for capturing and directing light from light emitting diode sources for Beacon lights.

2. Related Art

Many Beacon lights or obstruction lights are constructed utilizing incandescent bulbs. The incandescent bulb provides an even light distribution. However, because Beacon lights must flash intermittently and are typically very bright, the incandescent bulbs have a tendency to have a shorter life. This is problematic when the beacon light is arranged at the top of a tall building or tower. Accordingly, maintenance personnel must climb to the top of the tower or building in order to replace the incandescent bulb.

Other Beacon lights have been constructed using light emitting diodes. Light emitting diodes lights are beneficial in that they have a much longer life and do not typically need to be replaced as often as incandescent bulbs. However, the point source nature of light emitting diodes results in a light distribution which is overly bright or overly dim depending on the position in which the light is observed. More specifically, the beacon light must typically provide light across an essentially 360° range horizontally around the light. Similarly, the beacon light must provide a vertical spread of light having about a 3° distribution. These requirements allow the beacon light to provide the obstruction warning they are designed for such as aircraft coming from any direction and flying at an altitude close to the beacon light itself. The prior art approaches have used mirrors to spread and distribute the light. However, the mirrors or other distribution approaches do not provide an even light distribution over the desired range.

SUMMARY OF THE DISCLOSURE

According to an aspect of the disclosure, [to be completed by Baker Hostetler based on final claims prior to filing].

According to a further aspect of the disclosure, [to be completed by Baker Hostetler based on final claims prior to filing].

According to yet another aspect of the disclosure, [to be completed by Baker Hostetler based on final claims prior to filing].

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
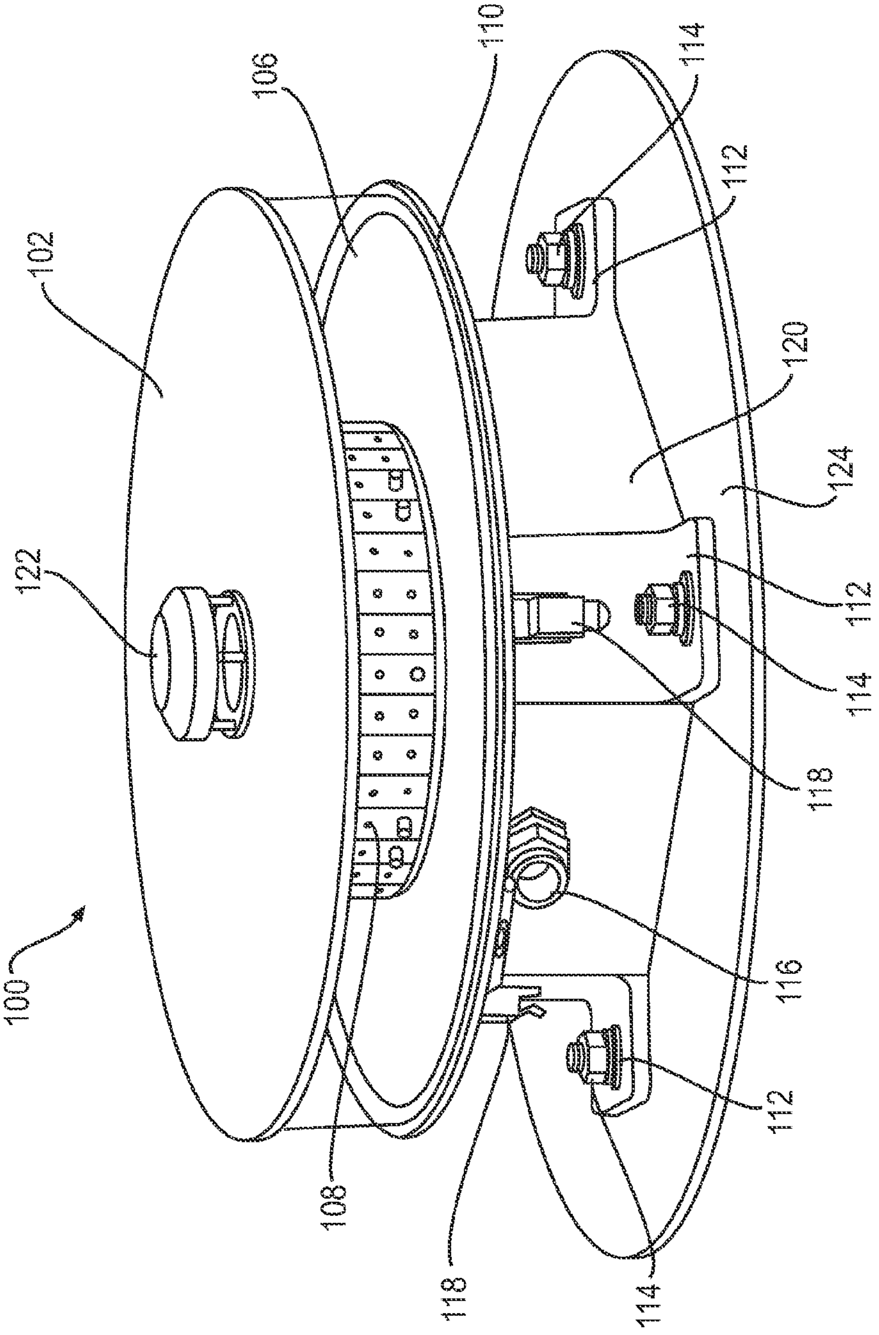
FIG. 1 shows a beacon light constructed in accordance with the principles of the invention.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 2:
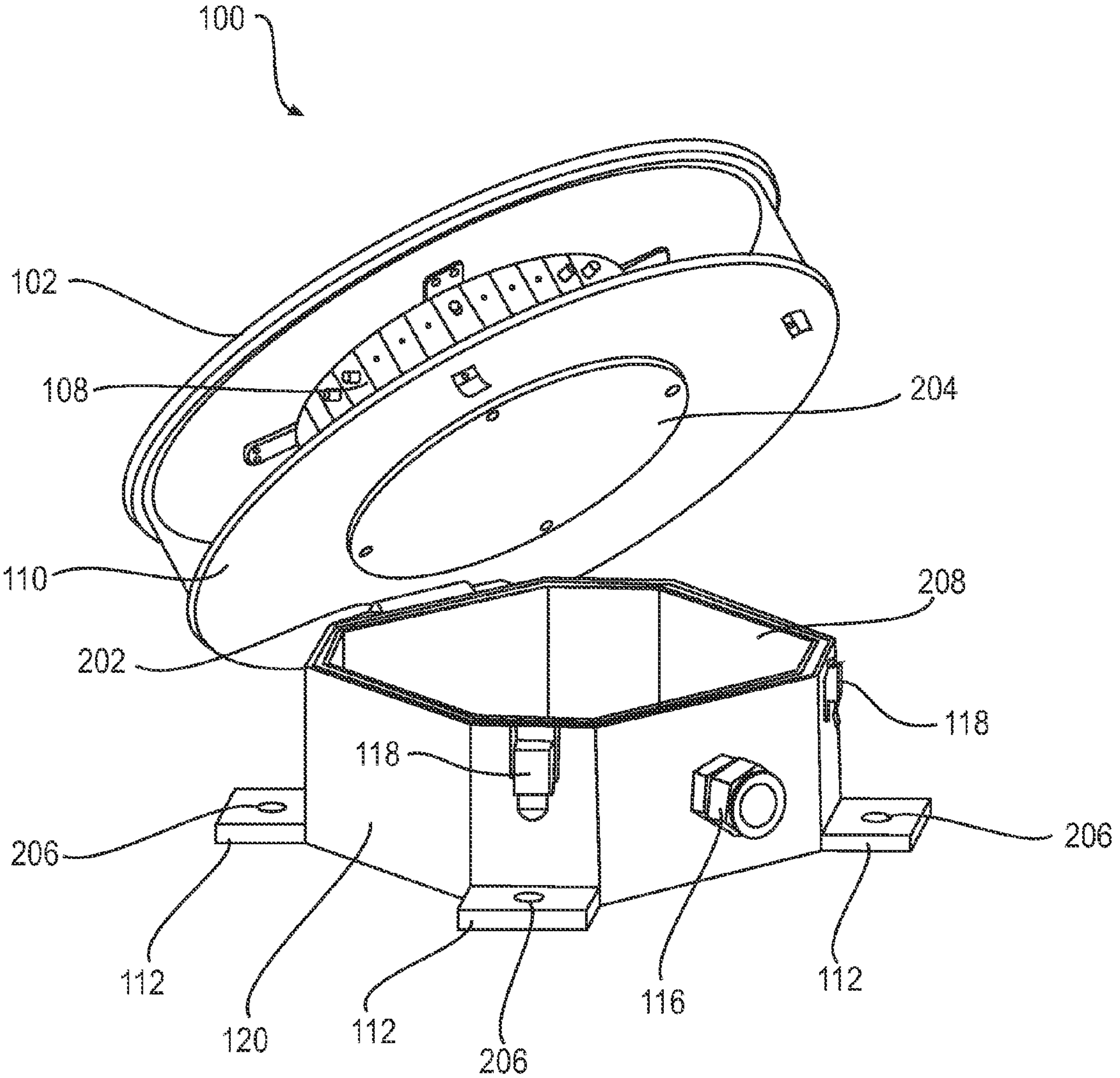
FIG. 2 shows the beacon light of FIG. 1 in an open position.
Figure 3:
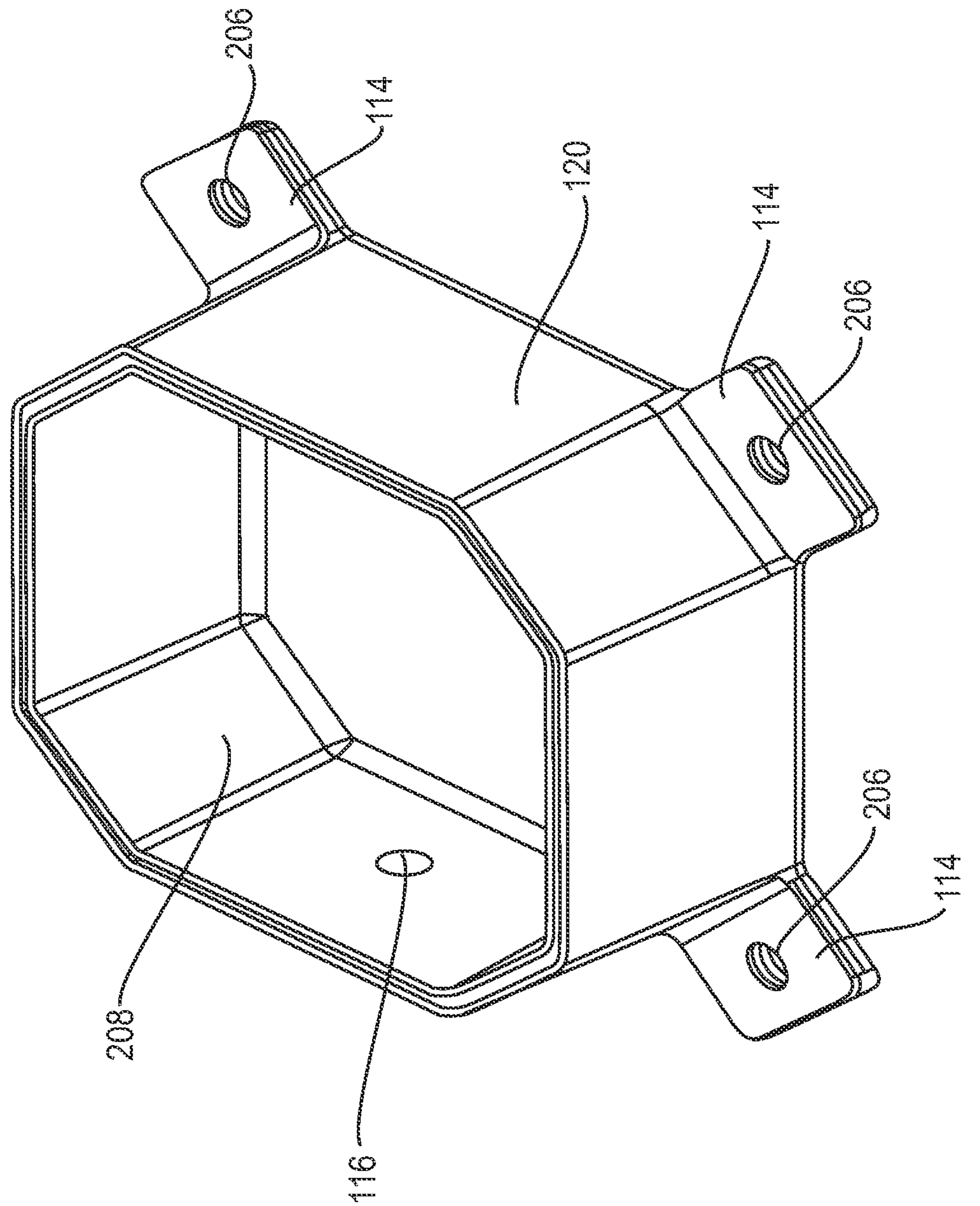
FIG. 3 shows a base of the beacon light of FIG. 1.

FIG. 1 shows a beacon light constructed in accordance with the principles of the invention; FIG. 2 shows the beacon light of FIG. 1 in an open position; and FIG. 3 shows a base of the beacon light of FIG. 1. In particular, FIG. 1 shows optics for the beacon light that are configured to capture and direct light from multiple light emitting diode sources into a 360° horizontal beam pattern and further configured to capture and direct light from the multiple light emitting diode sources into a predetermined vertical beam pattern. The optics provide a substantially even light distribution over the 360° horizontal beam pattern and substantially even light distribution over the predetermined vertical beam pattern. The predetermined vertical beam pattern may be configured to direct light along an optical axis with a beam spread of less than 20° in a direction perpendicular to the central light-emitting axis of each one of the plurality of LEDs. In a particular aspect, the predetermined vertical beam pattern may be 10°. In a further particular aspect, the predetermined vertical beam pattern may be less than 6°. In yet a further aspect, the predetermined vertical beam pattern may be 3°. Moreover, the optics are configured to provide very little stray or wasted light outside of this predetermined vertical beam pattern. Of course other horizontal and vertical beam patterns are contemplated by the invention. Moreover, other types of light sources other than light emitting diode are further contemplated. Finally, the horizontal beam pattern may be configured to provide less than 360° if desired in the particular application. For example, if multiple lights are utilized, then less than 360° of horizontal beam may be desired or appropriate.

In particular, FIG. 1 shows the beacon light 100 having a top plate 102 that may be constructed of a metallic or other material to provide weather resistance or protection from the environment to the internal components of the light 100. The top plate 102 may provide heat dissipation generated by the internal components. A bottom plate 110 may also be constructed of a metallic or other material and provide weather resistance or protection from the environment to the internal components of the light 100 as well. Arranged between the top plate 102 and the bottom plate 110 is a lens 106 providing the above-noted optic functionality. The optic functionality is described in greater detail below. Further, between the top plate 102 and the bottom plate 110 is a core 108 that includes a plurality of light emitting diodes.

The bottom plate 110 may be arranged on a base 120. The base 120 may include various electrical connections to the light 100. In particular, within the base 120 may be located a space 208 (shown in FIG. 2) to allow installers or maintenance personnel to connect, test, repair, and so on electrical and data lines connected to the light 100. This space 208 providing weather and environmental protection to these lines and their associated connections (not shown). The base 120 may be attached to a tower, tall building, or like structure 124. In order to provide the attachment to such a structure 124, the base 120 may include mounting structure either inside the base 120 or external to the base 120.

In one aspect, the base 120 may include mounts 112. As shown in FIG. 1, there may be four mounts 112 (only three mounts are shown). Of course any number of mounts 112 are contemplated in fastening the base 120 to a structure 124. The mounts 112 may be tabs extending from the base 120. The mounts 112 may include an aspect to allow for a mechanical fastener to secure the light 100 to the structure 124. The base 120 may be formed of metallic or other material. In a particular aspect, the base 120 may be cast metal material. The mounts 112 may be formed in the casting process of the base 120. Of course other constructions are contemplated as well. In a particular aspect, the mounts 112 may include a hole to receive a mechanical fastener 114. Other types of mechanical fastening of the base 120 to a structure 124 are contemplated as well.

The base may further include a strain relief 116. The strain relief 116 may be configured to receive the electrical and/or data lines or a conduit containing the same. The construction of the strain relief 116 may be to limit intrusion of water or other environmental contaminants to the light 100, conduit, or the like.

The base 120 may further include fasteners 118 to connect and hold the bottom plate 110 to the base 120. The fasteners 118 may take the form of a type of mechanical fastener. In the implementation shown in FIG. 1, the fasteners 118 may be spring-loaded pivotal fasteners arranged on the base 120 and that associate with a hook arranged on the bottom plate 110 as described in greater detail with respect to FIG. 9 below.

The light 100 may further include an ambient light sensor 122. The ambient light sensor 122 may sense the ambient light and control operation of the light 100 based on the same.

As shown in FIG. 2, the light 100 may include a pivot 202 connected between the bottom plate 110 and the base 120. The pivot 202 may be a hinge or similar structure. The pivot 202 may allow the top plate 102, core 108, bottom plate 110, lens 106, and the like to rotate up and away from the base 120 to allow an installer or maintenance personnel to gain access to the space 208 for installation and repair purposes. The fasteners 118, not shown in FIG. 2, may hold the top plate 102, core 108, bottom plate 110, lens 106, and the like to the base 120.

Figure 4:
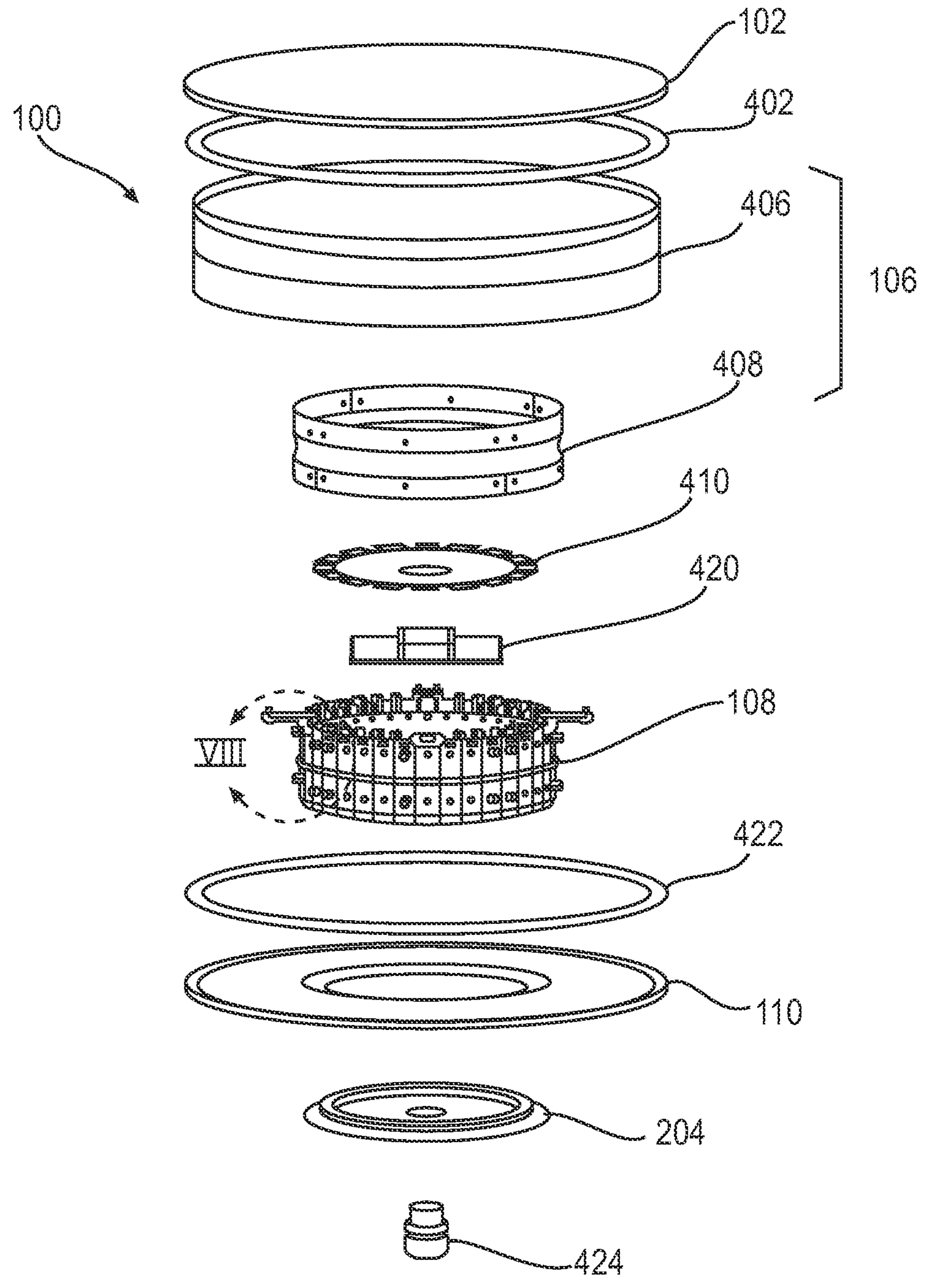
FIG. 4 shows an exploded view of the beacon light of FIG. 1.

FIG. 4 shows an exploded view of the beacon light of FIG. 1. In particular, FIG. 4 shows the details of the lens 106. The vertical height and diameter of the lens 106 are minimized while maintaining the optical requirements of a 360° horizontal beam pattern and a 3° vertical beam pattern. The lens 106 may include two circular ring shaped lenses 406, 408. An inner lens 408 (primary) is placed very close to a horizontal polar array of light emitting diodes that are mounted on the core 108. A larger diameter outer lens 406 (secondary) may be placed in the horizontal plane of the light emitting diodes and inner lens 408.

FIG. 4 further shows a gasket 402 arranged between the top plate 102 and an outer lens 406. The gasket 402 sealing a connection between the top plate 102 and the outer lens 406 and protecting the internal components of the light 100 from the environment. Similarly, a gasket 422 is arranged between the bottom plate 110 and the outer lens 406 for the same purpose.

FIG. 4 further shows the core 108 that may be arranged on the top plate 102. Arranged within the core 108 may be a printed circuit board mother board 410 and a printed circuit board core board 420. Both the mother board 410 and the core board 420 receiving power and/or data to drive the light emitting diodes associated with the core 108. The data and/or power lines may be received through, for example, the strain relief 116 shown in FIG. 1. The data and/or power lines may extend through the space 208 shown in FIG. 2, and may extend up through a cover 204 through a cord connector 424. Subsequently, data and/or power lines may connect to the mother board 410 and/or the core board 420.

Figure 5:
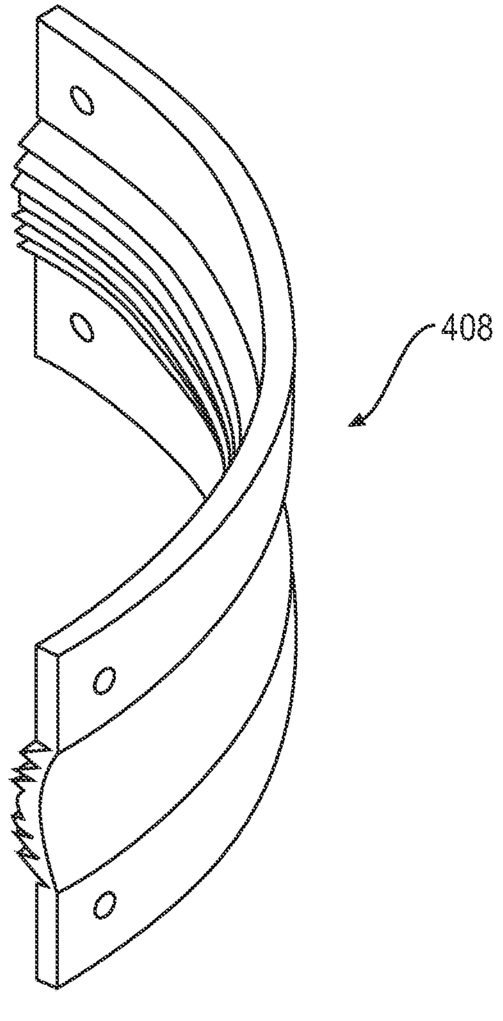
FIG. 5 shows a perspective view of a portion of the inner lens of the beacon light of FIG. 1.
Figure 6:
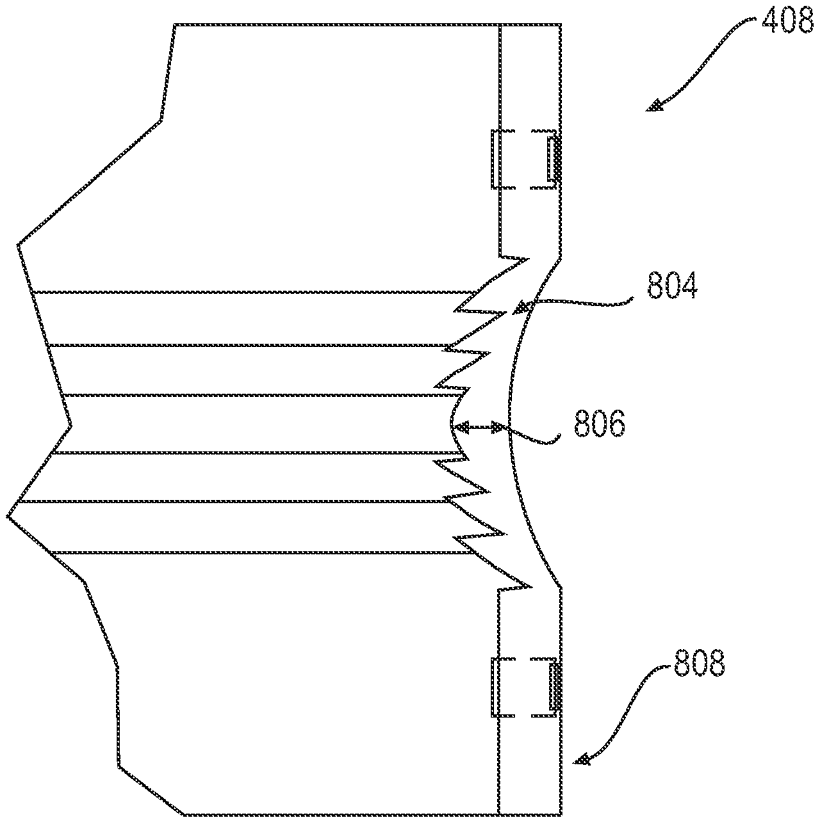
FIG. 6 shows a side view of a portion of the inner lens of the beacon light of FIG. 1.

FIG. 5 shows a perspective view of a portion of the inner lens of the beacon light of FIG. 1; and FIG. 6 shows a side view of a portion of the inner lens of the beacon light of FIG. 1. The inner lens or primary lens 408 may be constructed from a synthetic material. In particular, the primary lens 408 may be molded and/or machined with the desired profile. Moreover, the primary lens 408 may be constructed in one or more parts in order to make manufacturing easier and less costly. After the multiple parts are manufactured, they may be combined to form the ring shape shown in FIG. 4.

The primary lens 408 may be designed to capture as much light (1102 of FIG. 11) as reasonable from the light emitting diodes 510 over the emitted light angle. This may be accomplished, at least in part, by placing the lens close to the light emitting diode array 510 on the core 108 and using a series of total internal reflection (TIR) steps 804 arranged on the inner surface of the primary lens 408. The second function of the TIR steps is to provide the first stage of collimation (1104 of FIG. 11) of the light (1102 of FIG. 11) from the light emitting diode sources 510.

A concave profile 806 on the outer surface of the primary lens 408 may then redirect the collimated light (1104 of FIG. 11) in a diverging beam pattern (1106 of FIG. 11) to the secondary lens 406. The two lens system uses beam expander theory to provide a tight collimation necessary for the vertical beam pattern. The beam expander lens system takes a collimated beam (1106 of FIG. 11), expands the beam through a diverging lens, then recollimates the beam (1108 of FIG. 11) with the secondary lens 406. The resulting beam divergence (1110 of FIG. 11) is reduced by the inverse of the magnification factor.

Figure 11:
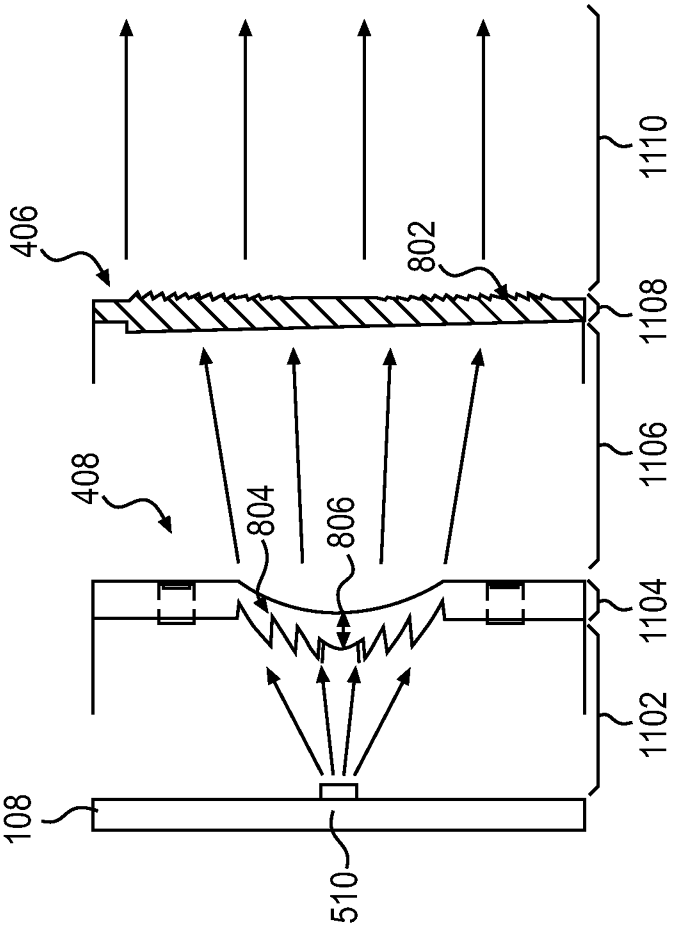
FIG. 11 shows a side view of a portion of the inner lens of the beacon light, the outer lens of the beacon light, and the core of the beacon light of FIG. 1.

As shown in FIG. 11, the inner lens 408 collimates 1104 the light from the plurality of light emitting diodes 510 and the outer lens 406 is configures to recollimate and focus 1108 a diverging beam 1106 from the inner lens 408. The inner lens 408 is configured to redirect collimated light in a diverging beam pattern 1106. The outer lens 406 is configured to recollimate and focus 1108 a diverging beam 1106 from the inner lens 408.

Figure 7:
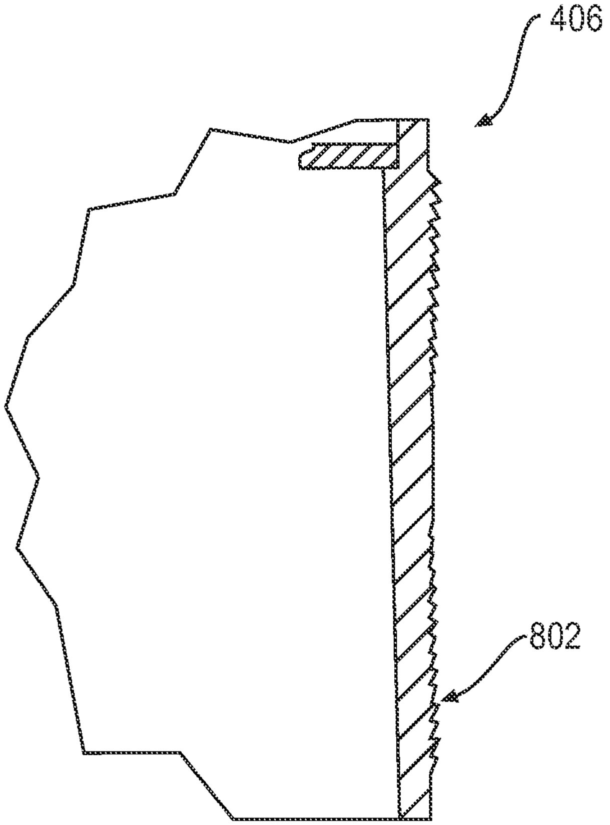
FIG. 7 shows a cross-section of the outer lens of the beacon light of FIG. 1.

FIG. 7 shows a perspective view of a portion of the outer lens of the beacon light of FIG. 1. The outer or secondary lens 406 may be constructed using a synthetic material. The outer or secondary lens 406 may be molded and/or machined to form the final shape. The outer or secondary lens 406 may take the expanded light from the primary lens 408 and recollimate the beam pattern using a single surface Fresnel lens 802. The magnification factor for the lens system may be approximately 2.5. Other magnification factors are contemplated as well. This results in a reduction in beam divergence, thus a highly collimated light output.

Figure 8:
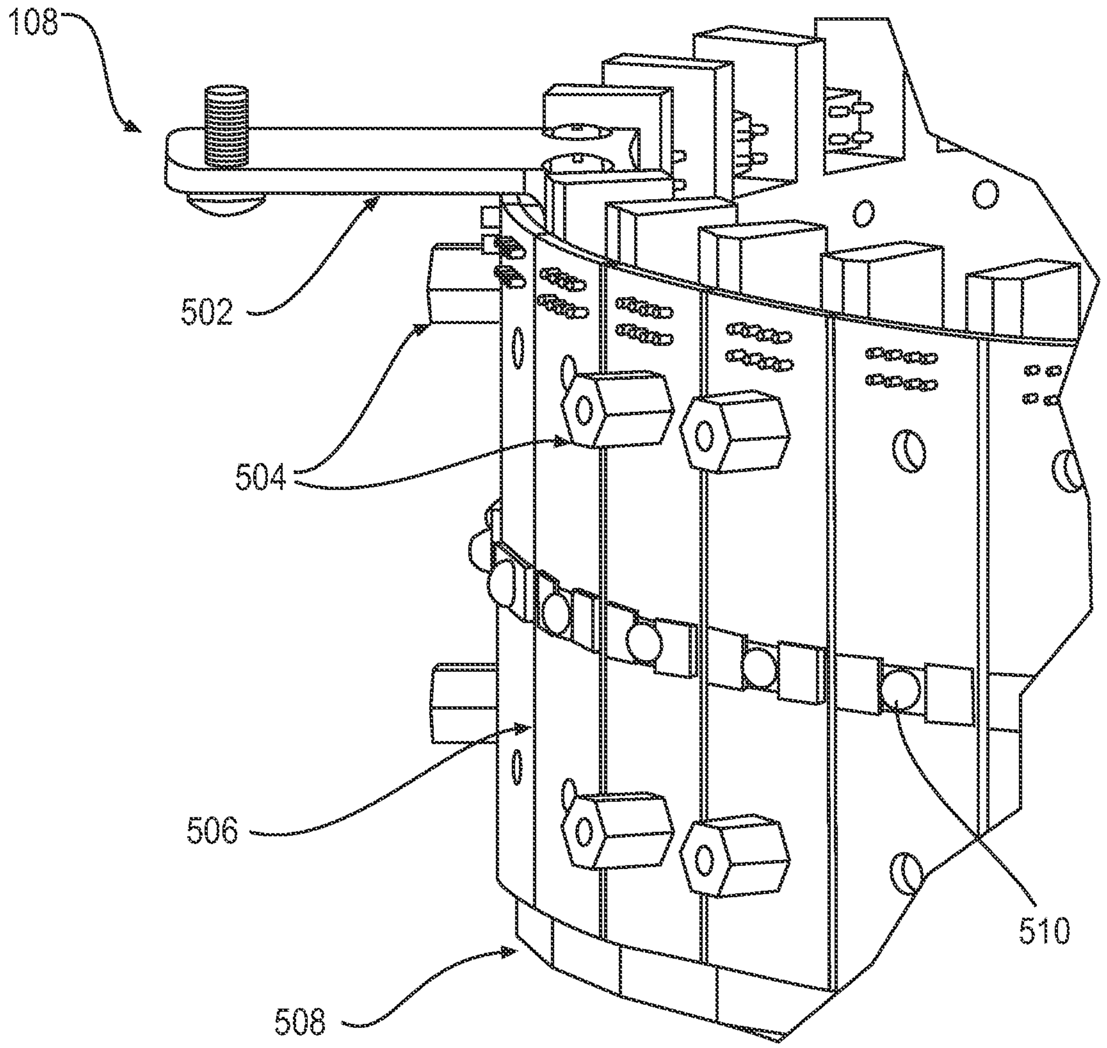
FIG. 8 shows a core of the beacon light of FIG. 1.

FIG. 8 shows a core of the beacon light of FIG. 1. In particular, FIG. 8 shows the core 108 having a plurality of printed circuit boards that have light emitting diode boards 506. In the implementation shown in FIG. 8, there are 36 light emitting diode boards 506. Of course, any number of boards is contemplated by the invention. In particular, the invention may be implemented with a single light emitting diode board 506. Moreover, the invention may be implemented with a single flexible light emitting diode board 506. Each of the light emitting diode boards 506 may have at least one light emitting diode 510. In a particular implementation, each of the light emitting diode boards 506 may have at least one white light emitting diode 510 and one red light emitting diode 510. The white light emitting diode 510 being operated during certain hours of the day; and the red light emitting diode 510 being operated during certain other hours of the day. Alternatively, the beacon light may operate with only white light emitting diodes 510; or the beacon light may operate with only red light emitting diodes 510. Additionally, the beacon light may operate with one or more infrared light emitting diodes 510 to allow for visibility utilizing night vision goggles.

Each of the light emitting diode boards 506 may be arranged and attached to a heat sink 508 of the core 108. The heat sink 508 may be a cylindrical metallic construction. The metallic construction providing greater heat sinking and transferring capabilities. Each board may be connected to the heat sink 508 by an adhesive and/or by a mechanical fastener. As shown in FIG. 8, a standoff 504 may be used to mechanically fasten one or more of the light emitting diode boards 506 to the heat sink 508. Each of the boards 506 may be wired and/or connected to, and receive power from, at least one of the mother board 410, the core board 420, or an adjacent LED board 506. Additionally, the core 108 may include one or more core clips 502 that are configured with a fastener to fasten the core 108 through the core clip 502 to the top plate 102. In a particular aspect, there may be four core clips 502.

Figure 9:
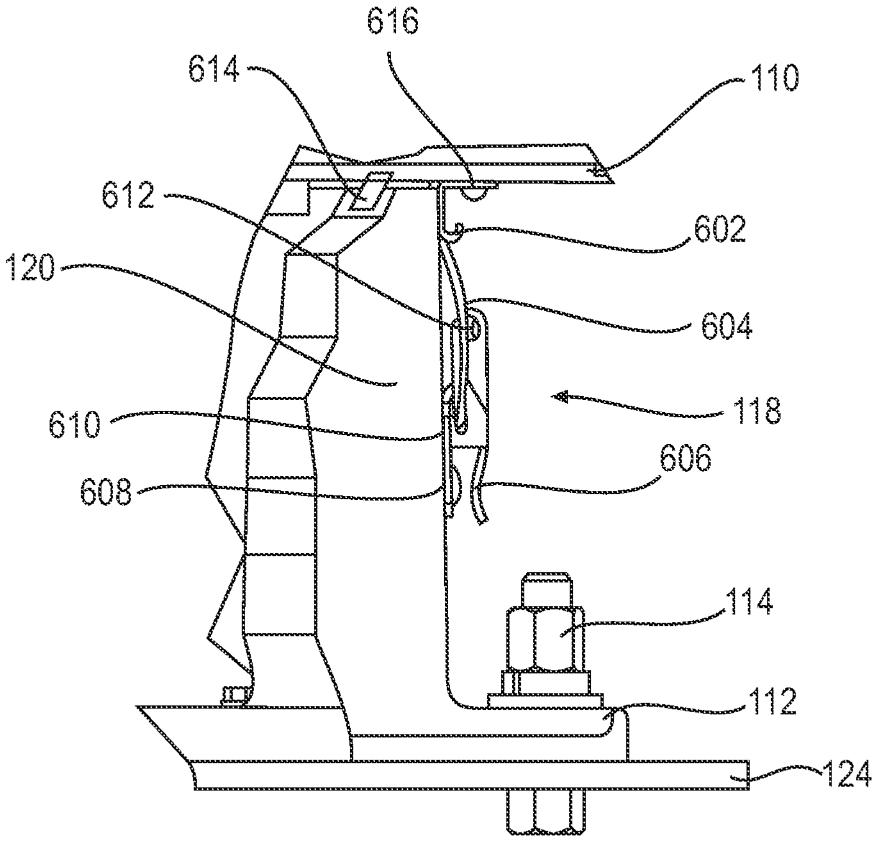
FIG. 9 shows a fastener of the beacon light of FIG. 1.

FIG. 9 shows a fastener of the beacon light of FIG. 1. In particular, FIG. 9 shows the bottom plate arranged on top of the base 120. Between the bottom plate 110 and the base 120 may be a gasket 614 to prevent the intrusion of water and other environmental contaminants. Attached to the bottom of the bottom plate 110 may be a hook 602. The hook 602 may be fastened to the bottom of bottom plate 110 by any known manner. In the implementation shown in FIG. 9, the hook 602 is fastened to the bottom of bottom plate 110 by mechanical fastener 616. The fasteners 118 may include a clasp 604 to engage and hold onto the hook 602. It is noted, that in the arrangement of FIG. 9, the clasp 604 is not connected to the hook 602. The clasp 604 may be pivotally connected to the rotating body 606. The rotating body 606 rotating about a pivot point 612. When the rotating body 606 rotates about pivot point 612 the clasp 604 moves up and down. The rotating body 606 may be connected through the pivot point 612 to a base 610. The base 610 may be attached to the base 120. In the implementation shown in FIG. 9, the base 610 is mechanically fastened to the base 120 by a mechanical fastener 608.

Figure 10:
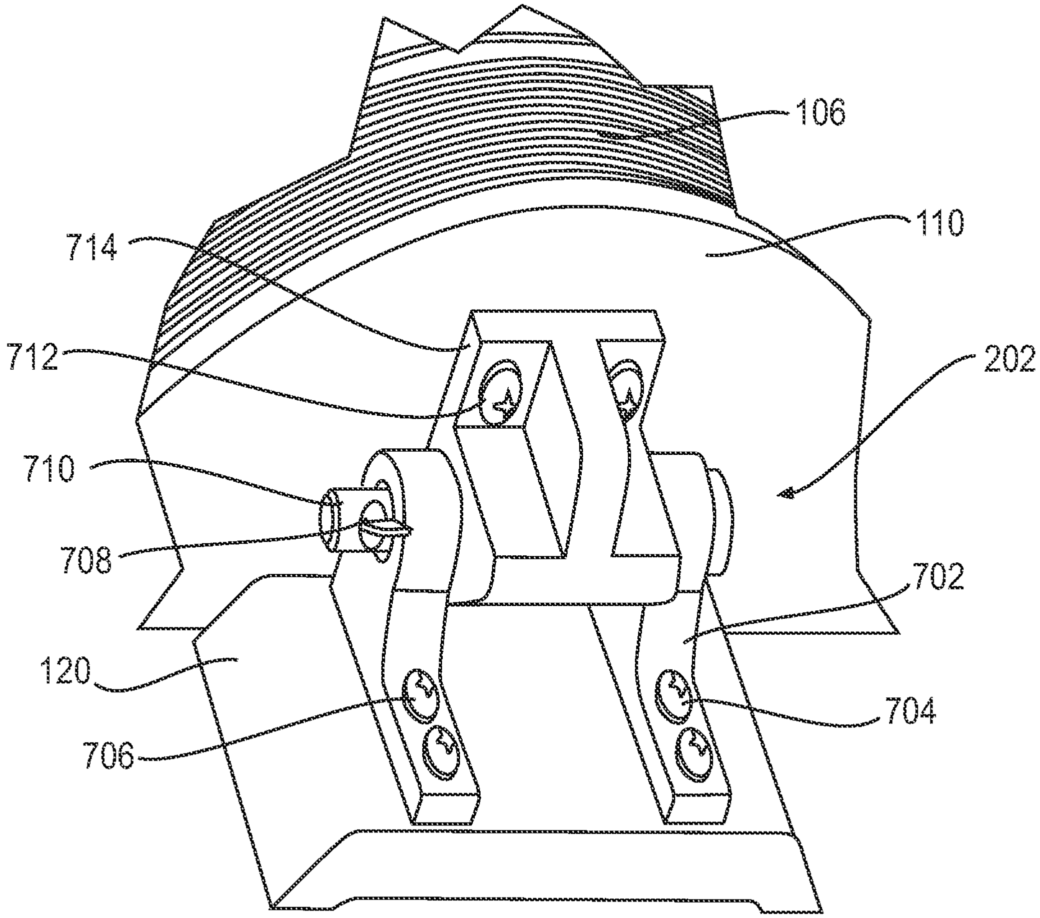
FIG. 10 shows pivot hardware of the beacon light of FIG. 1.

FIG. 10 shows pivot hardware of the beacon light of FIG. 1. In particular, FIG. 10 shows a particular implementation of the pivot 202. As shown in FIG. 10, the pivot 202 may include a pivot stationary portion 702. The pivot stationary portion 702 may be fastened to the base 120. In a particular implementation, the pivot stationary portion 702 may be attached to the base 120 with mechanical fasteners 704, 706. The pivot 202 may further include a pivot rotating portion 714. The pivot rotating portion 714 may be attached to the bottom plate 110. In a particular implementation, the pivot rotating portion 714 may be attached to the bottom plate 110 with mechanical fasteners 712. The pivot stationary portion 702 may be connected to the pivot rotating portion 714 with a pin 710. The pin 710 may extend through at least one hole formed in the pivot stationary portion 702 and at least one hole formed in the pivot rotating portion 714. The combination of the pin 710, the pivot rotating portion 714, and the pivot stationary portion 702 allowing the bottom plate 110 to rotate with respect to the base 120. The pin 710 may in some aspects include a hole arranged on the end thereof to receive a locking pin 708. The locking pin 708 may be configured to prevent the pin 710 from becoming dislocated and allowing the pivot rotating portion 714 to become disassociated with the pivot stationary portion 702. Additionally, the pivot rotating portion 714 may be configured to act as a stop to limit rotation of the bottom plate 110 so as to prevent the bottom plate 110 from rotating and potentially damaging the beacon light 100.

The pivot 202 arrangement shown in FIG. 10 may allow an installer or maintenance personnel additional freedom with respect to the installation and maintenance of the beacon light 100. In particular, an installer may install the base 120 and subsequently attach and install the remainder of the beacon light 100 attached to the bottom plate 110. Similarly, maintenance personnel can more easily remove the upper portion of the beacon light 100 attached to the bottom plate 110 for replacement or repair. This is due to the ease at which the pivot 202 may be taken apart due to the use of the pin 710 that can be easily removed from the pivot 202 and allow separation of the components.

Accordingly, the beacon light constructed in accordance with the principles of the invention includes optics for the beacon light that are configured to capture and direct light from multiple light emitting diode sources into a 360° horizontal beam pattern and further configured to capture and direct light from the multiple light emitting diode sources into approximately 3° vertical beam pattern. The optics provide a substantially even light distribution over the 360° horizontal beam pattern and substantially even light distribution over the 3° vertical beam pattern.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A beacon light and lens system comprising:

a plurality of light emitting diodes;

a lens comprising optics configured to capture and direct light from the plurality light emitting diodes, the lens comprising an inner lens arranged adjacent to the plurality of light emitting diodes;

the lens further comprising an outer lens arranged adjacent the inner lens; and the outer lens having a larger diameter than the inner lens, wherein the inner lens comprises a concave profile on an outer surface thereof.

2. The lens system according to claim 1 wherein the inner lens comprises total internal reflection steps arranged on an inner surface of the inner lens.

3. The lens system according to claim 1 wherein the inner lens collimates the light from the plurality of light emitting diodes.

4. The lens system according to claim 1 wherein the inner lens collimates the light from the plurality of light emitting diodes and wherein the outer lens is configured to recollimate and focus a diverging beam from the inner lens.

5. The lens system according to claim 1 wherein the inner lens is configured to redirect collimated light in a diverging beam pattern.

6. The lens system according to claim 1 wherein the outer lens is configured to recollimate and focus a diverging beam from the inner lens.

7. The lens system according to claim 1 wherein the outer lens comprises a Fresnel lens configuration.

8. The lens system according to claim 1 further comprising:

a top plate configured to cover the lens;

a bottom plate configured to support the lens;

a core configured to hold the plurality of light emitting diodes;

driving circuits for the plurality of light emitting diodes being arranged in the core; and the core being supported by the bottom plate, wherein the core comprises a heat sink configured to draw heat from the light emitting diodes.

9. The lens system according to claim 1 further comprising:

a base configured to be attached to a structure;

the base further configured to support a bottom plate; and the base further configured to receive at least one of power lines and data lines.

10. The lens system according to claim 1 further comprising:

a pivot arranged between a base and a bottom plate to allow the bottom plate to rotate with respect to the base; and a fastener configured to fasten the base to the bottom plate to prevent rotation therebetween.

11. The lens system according to claim 1 wherein the system generates a 360° horizontal beam pattern and vertical beam pattern less than 20°.

12. The lens system according to claim 1 further comprising:

a base configured to be attached to a structure;

the base further configured to support a bottom plate;

the base further configured to receive at least one of power lines and data lines;

a pivot arranged between the base and the bottom plate to allow the bottom plate to rotate with respect to the base; and a fastener configured to fasten the base to the bottom plate to prevent rotation therebetween.

13. The lens system according to claim 1 wherein the system generates a 360° horizontal beam pattern and vertical beam pattern less than 20°.

14. A beacon light and lens system comprising:

a plurality of light emitting diodes;

a lens configured to capture and direct light from the plurality light emitting diodes, the lens comprising an inner lens arranged adjacent to the light emitting diodes;

the lens further comprising an outer lens arranged adjacent the inner lens;

the outer lens having a larger diameter than the inner lens, wherein the inner lens comprises total internal reflection steps arranged on an inner surface of the inner lens; and wherein the inner lens comprises a concave profile on an outer surface thereof.

15. The lens system according to claim 14 wherein the inner lens collimates the light from the plurality of light emitting diodes.

16. The lens system according to claim 14 wherein the outer lens is configured to recollimate and focus a diverging beam from the inner lens and wherein the outer lens comprises a Fresnel lens configuration.

17. The lens system according to claim 14 further comprising at least one of:

a top plate configured to cover the lens;

a bottom plate configured to support the lens;

a core configured to hold the plurality of light emitting diodes;

a heat sink configured to draw heat from the light emitting diodes.

18. A beacon light and lens system comprising:

a plurality of light emitting diodes;

a lens configured to capture and direct light from the plurality light emitting diodes, the lens comprising an inner lens arranged adjacent to the light emitting diodes;

the lens further comprising an outer lens arranged adjacent the inner lens;

the outer lens having a large diameter than the inner lens, wherein the inner lens comprises total internal reflection steps arranged on an inner surface of the inner lens, and wherein the inner lens collimates the light from the plurality of light emitting diodes and wherein the inner lens is configured to redirect collimated light in a diverging beam pattern.

* * * * *

UNITED STATES PATENT AND TRADEMARK OFFICE

CERTIFICATE OF CORRECTION

PATENT NO. : 8,926,148 B2
APPLICATION NO. : 13/939687
DATED : January 6, 2015
INVENTOR(S) : Christopher Shumate et al.

It is certified that error appears in the above-identified patent and that said Letters Patent is hereby corrected as shown below:

In the Specification

Column 1, lines 48 – 55

Please replace:
"According to an aspect of the disclosure, [to be completed by Baker Hostetler based on final claims prior to filing].
According to a further aspect of the disclosure, [to be completed by Baker Hostetler based on final claims prior to filing].
According to yet another aspect of the disclosure, [to be completed by Baker Hostetler based on final claims prior to filing]."

And insert

--According to an aspect of the disclosure, a beacon light and lens system includes a plurality of light emitting diodes, a lens including optics configured to capture and direct light from the plurality light emitting diodes, the lens including an inner lens arranged adjacent to the plurality of light emitting diodes, the lens further including an outer lens arranged adjacent the inner lens, and the outer lens having a larger diameter than the inner lens.

According to a further aspect of the disclosure, a beacon light and lens system including a plurality of light emitting diodes, a lens configured to capture and direct light from the plurality light emitting diodes, the lens including an inner lens arranged adjacent to the light emitting diodes, the lens further including an outer lens arranged adjacent the inner lens, the outer lens having a larger diameter than the inner lens, where the inner lens includes total internal reflection steps arranged on an inner surface of the inner lens.--

Signed and Sealed this
Twenty-third Day of June, 2015

Michelle K. Lee

Michelle K. Lee
*Director of the United States Patent and Trademark Office*